US010144148B2

(12) United States Patent
Laghate et al.

(10) Patent No.: US 10,144,148 B2
(45) Date of Patent: Dec. 4, 2018

(54) SYSTEM AND METHOD FOR KICKBACK DETECTION IN A CIRCULAR SAW

(71) Applicants: Robert Bosch Tool Corporation, Broadview, IL (US); Robert Bosch GmbH, Stuttgart (DE)

(72) Inventors: Gaurav Pradip Laghate, Bangalore (IN); Bharadwaja Maharshi Ramaswamy, Bangalore (IN); Sandeep Bairampalli, Bangalore (IN)

(73) Assignees: Robert Bosch Tool Corporation, Broadview, IL (US); Robert Bosch GmbH, Stuttgart (DE)

( * ) Notice: Subject to any disclaimer, the term of this patent is extended or adjusted under 35 U.S.C. 154(b) by 439 days.

(21) Appl. No.: 14/823,533

(22) Filed: Aug. 11, 2015

(65) Prior Publication Data
US 2016/0046035 A1 Feb. 18, 2016

Related U.S. Application Data

(60) Provisional application No. 62/036,133, filed on Aug. 12, 2014.

(51) Int. Cl.
*B27G 19/02* (2006.01)
*B23D 47/08* (2006.01)
(Continued)

(52) U.S. Cl.
CPC ............. *B27G 19/02* (2013.01); *B23D 47/08* (2013.01); *B27B 5/38* (2013.01); *F16P 3/14* (2013.01)

(58) Field of Classification Search
CPC . B27G 19/02; B23D 47/08; F16P 3/14; G05B 19/406
See application file for complete search history.

(56) References Cited

U.S. PATENT DOCUMENTS 7,552,781 B2   6/2009   Zhang et al.
7,698,978 B2   4/2010   Shibata
(Continued)

FOREIGN PATENT DOCUMENTS

EP          1842635 A3    12/2010
WO    WO2006128760 A1    12/2006

OTHER PUBLICATIONS

International Search Report and Written Opinion corresponding to PCT Application No. PCT/US2015/044688, dated Oct. 26, 2015 (12 pages).

*Primary Examiner* — Omar Flores Sanchez
(74) *Attorney, Agent, or Firm* — Maginot, Moore & Beck LLP

(57) ABSTRACT

A method of detecting kickback during operation of a saw includes identifying with a controller in a saw a measured rotational speed of a rotating blade in the saw with reference to signals from a rotational rate sensor, identifying with the controller an estimated rotational speed of the rotating blade in the saw with reference to the measured rotational speed, at least one previously measured rotational speed, and a measurement of a previous change in rotational speed of the rotating blade, identifying with the controller an estimated torque force for a drive shaft of a motor in the saw that rotates the blade with reference to the measured rotational speed, and activating with the controller a blade arrest mechanism in response to a difference between the measured rotational speed and the estimated rotational speed exceeding a first threshold and the estimated torque force exceeding a second threshold.

10 Claims, 4 Drawing Sheets

(51) Int. Cl.
*B27B 5/38* (2006.01)
*F16P 3/14* (2006.01)

(56) References Cited

U.S. PATENT DOCUMENTS

| | | | |
|---|---|---|---|
| 7,908,952 B2 | 3/2011 | Wilson et al. | |
| 9,962,780 B2* | 5/2018 | Chen | B23D 55/06 |
| 2005/0145080 A1 | 7/2005 | Voigtlaender | |
| 2007/0194617 A1* | 8/2007 | Moller | B23D 59/001 |
| | | | 299/1.5 |
| 2010/0064532 A1 | 3/2010 | Wittke et al. | |
| 2011/0226105 A1 | 9/2011 | Butler et al. | |
| 2012/0036725 A1 | 2/2012 | Osborne et al. | |
| 2014/0216220 A1* | 8/2014 | Mehta | B27G 19/02 |
| | | | 83/13 |
| 2014/0318342 A1* | 10/2014 | Koegel | B23D 45/068 |
| | | | 83/477.1 |
| 2015/0094859 A1* | 4/2015 | Awerbuch | B23D 47/08 |
| | | | 700/275 |
| 2016/0089810 A1* | 3/2016 | Padmanabhan | B27G 19/02 |
| | | | 83/13 |
| 2016/0146226 A1* | 5/2016 | Goedken | F15B 13/0401 |
| | | | 60/431 |

* cited by examiner

SYSTEM AND METHOD FOR KICKBACK DETECTION IN A CIRCULAR SAW

CLAIM OF PRIORITY

This application claims priority to U.S. Provisional Application No. 62/036,133, which is entitled "System And Method For Kickback Detection In A Circular Saw," and was filed on Aug. 12, 2014, the entire contents of which are hereby incorporated by reference herein.

FIELD

This disclosure relates generally to power tools, and, more specifically, to systems and methods for detecting kickback during operation of a circular saw.

BACKGROUND

Power saws and circular saws in particular are commonly used for cutting work pieces such as wood. In some operating conditions, a power saw experiences kickback. For handheld power saws, kickback occurs when the saw physically recoils from the work piece instead of cutting through the work piece. In a table saw, kickback occurs when a work piece recoils from the saw blade instead of being cut by the saw blade. Existing saws include riving knives and other guards that help to reduce the occurrences of kickback. These saws, however, cannot detect when kickback occurs and take an action, such as engaging a blade arresting device or blade drop device, to reduce or eliminate the kickback. Consequently, improvements to saws that enable improved detection of kickback during operation would be beneficial.

SUMMARY

In one embodiment, a method of detecting kickback during operation of a saw blade has been developed. The method includes identifying with a controller in a saw a measured rotational speed of a rotating blade in the saw with reference to signals from a rotational rate sensor, identifying with the controller an estimated rotational speed of the rotating blade in the saw with reference to the measured rotational speed, at least one previously measured rotational speed, and a measurement of a previous change in rotational speed of the rotating blade, identifying with the controller an estimated torque force for a drive shaft of a motor in the saw that rotates the blade with reference to the measured rotational speed, and activating with the controller a blade arrest mechanism in response to a difference between the measured rotational speed and the estimated rotational speed exceeding a first threshold and the estimated torque force exceeding a second threshold.

In another embodiment, a circular saw that detects the occurrence of kickback events has been developed. The circular saw includes a motor configured to rotate a blade to cut a work piece, a rotational rate sensor configured to identify a rotational speed of the blade, a blade arrest mechanism, and a controller operatively connected to the motor, the rotational rate sensor, the blade arrest mechanism, and a memory. The controller is configured to operate the motor to rotate the blade, identify a measured rotational speed of the rotating blade with reference to signals from the rotational rate sensor, identify an estimated rotational speed of the rotating blade with reference to the measured rotational speed, at least one previously measured rotational speed stored in the memory, and a measurement of a previous change in rotational speed of the rotating blade stored in the memory, identify an estimated torque force for a drive shaft of the motor with reference to the measured rotational speed, and activate the blade arrest mechanism in response to a difference between the measured rotational speed and the estimated rotational speed exceeding a first threshold and the estimated torque force exceeding a second threshold.

DETAILED DESCRIPTION

For the purposes of promoting an understanding of the principles of the embodiments described herein, reference is now made to the drawings and descriptions in the following written specification. No limitation to the scope of the subject matter is intended by these references. This patent also encompasses any alterations and modifications to the illustrated embodiments as well as further applications of the principles of the described embodiments as would normally occur to one skilled in the art to which this document pertains.

Figure 4:
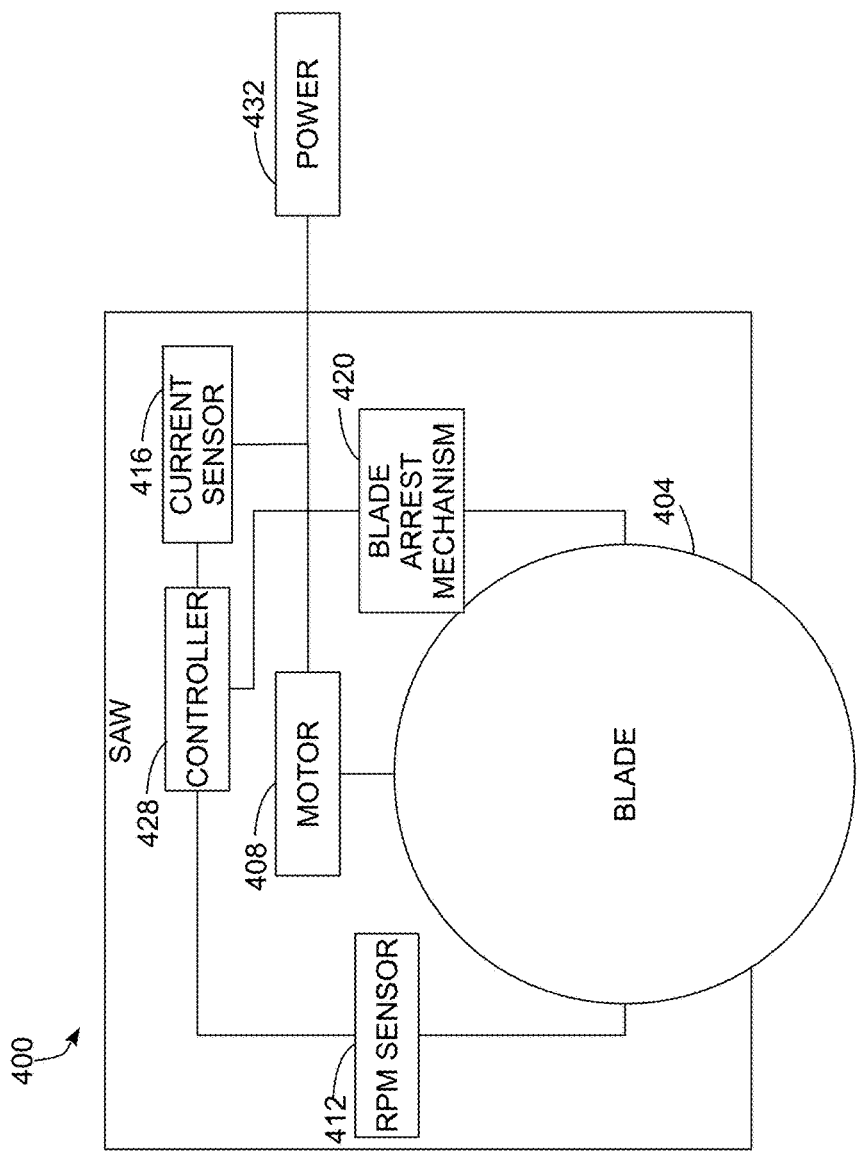
FIG. 4 is a schematic diagram of a saw that is configured to detect kickback using the processes that are illustrated in FIG. 1 and FIG. 3.

As described below, kickback detection processes in a saw identify the occurrence of a kickback event to enable the saw to deactivate a motor or engage a blade arrest mechanism to reduce or eliminate the effects of the kickback. In the discussion below, a reference to a kickback detection process performing an action or function refers to the operation of a controller, such as a digital control device, to execute stored program instructions to perform the function or action in conjunction with other components in a saw. FIG. 4 depicts an example of a saw 400 that is configured to perform the kickback detection processes that are described below. The saw 400 includes a rotating blade 404, motor 408, a rotational rate sensor 412 that detects rotations per minute (RPM) or other suitable rotational rate of the blade 404, a current sensor 416 that detects a level of current from a power supply 432 that drives the motor 408, and a digital controller 428. The current sensor 416 is used in some saw embodiments that measure current as part of a process for kickback detection. Other embodiments of the saw 400 detect kickback without requiring a measurement of electrical current, and these saw embodiments optionally omit the current sensor 416. The RPM sensor 412 is, for example, a Hall Effect sensor or any other suitable sensor that measures an actual rate of rotation for the blade 404. The motor 408 is an electric motor that receives electrical power from the power supply 432, which is a battery or a connection to an electric utility grid in some common embodiments. The motor 408 rotates a drive shaft that engages an arbor and the blade 404 to rotate the blade 404 during operation of the saw 400. In some embodiments, the motor 408 rotates the drive shaft, arbor and the blade 404 directly in a configuration where the blade 404 rotates at substantially the same rate as the drive shaft of the motor 408. In other embodiments, an intermediate transmission engages the drive shaft of the motor 408 and the arbor for the blade 404 and the blade 404 rotates at a different rate than the drive shaft of the motor 408. In either embodiment, the torque forces that the drive shaft of the motor 408 experiences are related to the rotational rate of the drive shaft and blade and to the levels of electrical current that the motor 408 consumes to rotate the drive shaft and blade 404 during operation of the saw 400. The current sensor 416 measures a level of electrical current that the motor 408 draws from the power supply 432 during operation.

In the saw 400, the digital controller 428 is, for example, a microcontroller, microprocessor, field programmable gate array (FPGA), or other suitable digital processing device that is configured to detect kickback in the saw 400. The controller 428 incorporates or is operatively connected to a memory device that stores both programmed instructions and a history of sensor data pertaining to operation of the saw including a history of the estimated and measured rotational speed of the blade 404. The controller 428 is operatively connected to the motor 408, RPM sensor 412, current sensor 416, and blade arrest mechanism 420. The blade arrest mechanism 420 is a device that halts the rotation of the blade 404 or withdraws the blade 404 from contact with the work piece rapidly to mitigate kickback. In one embodiment, the blade arrest mechanism 420 is a blade brake that halts rotation of the blade 404. In another embodiment, the blade arrest mechanism includes an arbor that is mounted to a moveable member under the table of the saw and a pyrotechnic charge or other suitable device moves both the arbor and the blade 404 below the surface of the table and out of contact with the work piece in a rapid manner. More generally, a blade arrest mechanism is any device that halts movement of a blade and/or removes the blade from contact with a work piece. Other embodiments of blade arrest mechanisms include blade retraction devices in circular table saws that retract the blade below the surface of the table saw.

Figure 1:
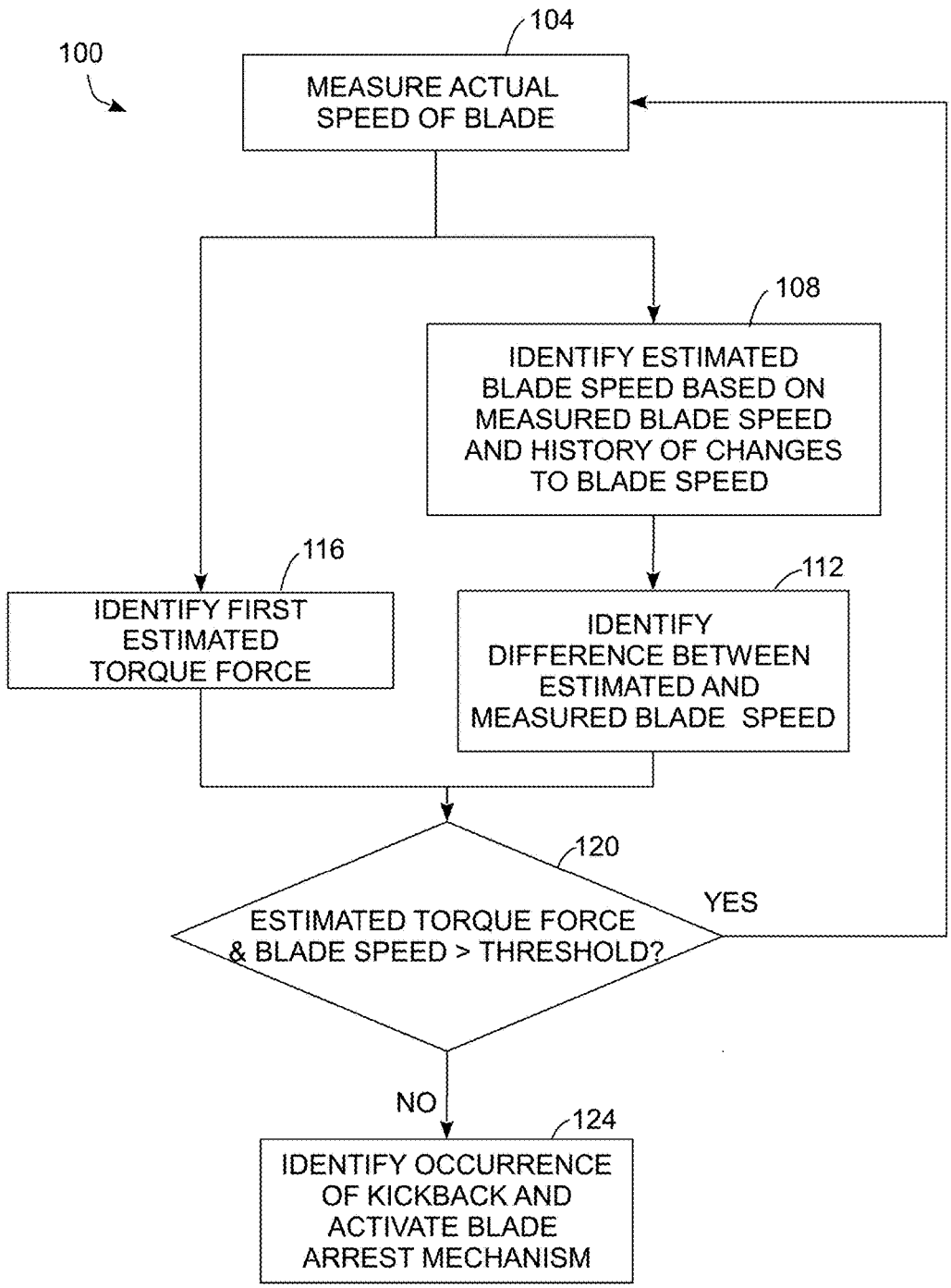
FIG. 1 is a block diagram of a process for detecting kickback during operation of a saw.

FIG. 1 depicts a process 100 for measuring kickback. The process 100 is described with reference to the saw 400 of FIG. 4 for illustrative purposes. During process 100, the controller 428 measures the actual rotational rate of the blade 404 with reference to signals that are received from the RPM sensor 412 (block 104). The controller 428 also identifies an estimated speed of the blade 404 based on changes to the measured rotational speeds of the blade 404 that the RPM sensor 412 measures over time. The controller 428 stores a history of the measured blade rotation rates in a memory and generates an estimate of the present time blade speed based on the measured change in blade rotational speed and the mean and standard deviations of the previously measured blade speeds (block 108). The controller 428 identifies the change in blade velocity as a function $a(i)=x(i)-x(i-1)$ where i represents the present time, $x(i)$ is the measured rotational velocity at the present time that is measured during the processing described with reference to block 104, and $x(i-1)$ is previously generated measurement of the blade speed at a predetermined time period in the past (e.g. 10 milliseconds prior to the present time). In one embodiment, the controller 428 identifies a mean and standard deviation of a predetermined number of measurements of actual rotational speed from the RPM sensor 412 over a predetermined time period and generates the estimated for the rotational speed based on the mean and standard deviation For example, in one configuration the controller 428 generates the estimate based on the sum of the mean of the previously measured rotational speeds with a multiple of the standard deviation of the previously measured rotational speeds: Estimate=mean $(x(i)+ \ldots (x(i-n)))+M(std\_dev(x(i)+ \ldots x(i-n)))$. In the previous equation, M is a multiplier that is selected based on the identified change in blade rotation speed $a(i)$. The mean function is the arithmetic, geometric, or harmonic mean functions. The std_dev_ function refers to the standard deviation function. The controller 428 identifies M from a lookup table (LUT) stored in the memory or from a predetermined equation based on the change in blade rotation speed $a(i)$. The multiple of the standard deviation is either a positive or negative number that the controller 428 selects based on the measured change in the rotational speed of the blade 404 to generate the estimated present time rotational speed of the blade 404.

During the process 100, the controller 428 identifies a difference between the measured rotational speed of the blade 404 and the estimated rotational speed of the blade 404 (block 112). Additionally, the controller 428 generates an estimate of the torque force in the blade 404 (block 116). To generate the estimate of the torque force, the controller 428 uses the present-time measurement of the rotational speed for the motor 408 $x(i)$ in conjunction with a quadratic equation for torque: $T(i)=m_1*x(i)^2+m_2*x(i)+x(i)$ where $m_1$ and $m_2$ are empirically derived torque coefficients for the motor 408. The estimated force is: $Est\_f(i)=T(i)/d$ where d is the predetermined diameter of the drive shaft of the motor 408. Those having skill in the art should note that the processing described with reference to blocks 104-112 and 116 can occur in any order or concurrently in different embodiments of the process 100.

Figure 2:
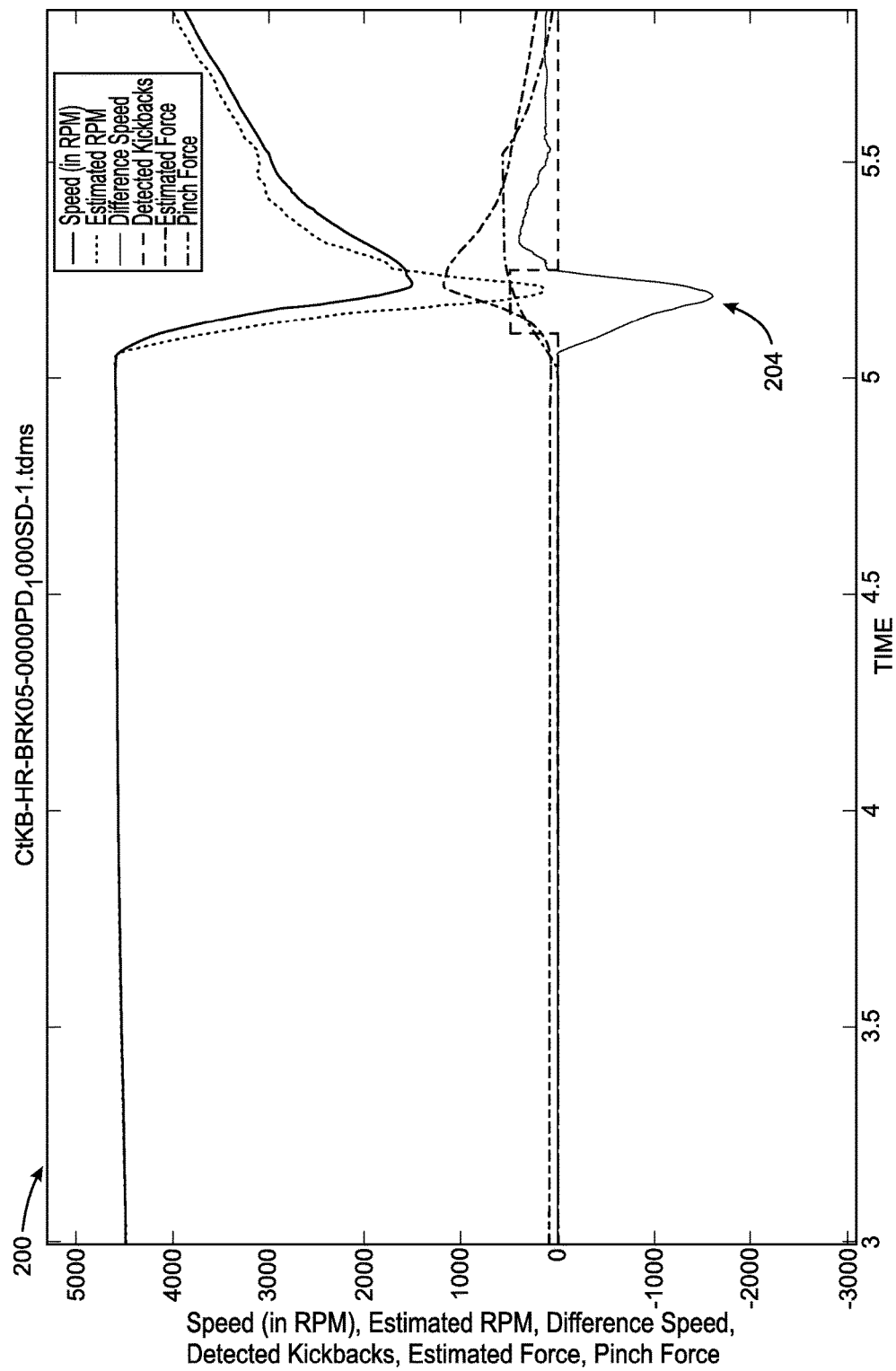
FIG. 2 is a graph that depicts detection of a kickback during operation of a saw.

During the process 100, the saw 400 continues to rotate the blade 404 during operation as long as either or both of the identified difference between the estimated rotational speed and measured rotational speed of the blade 404 and estimated torque force remain below predetermined thresholds (block 120). However, if the controller 428 identifies that both the difference between the estimated rotational speed and measured rotational speed of the blade 404 exceeds a first threshold and the estimated torque force on the drive shaft of the motor 408 exceeds a second threshold (block 120), then the controller 428 identifies that the saw 400 is experiencing kickback (block 124). Thus, the controller 428 identifies the occurrence of a kickback in situations where both the torque force levels and rotational speeds of the saw blade experience rapid increase above the predetermined operating thresholds for the saw. FIG. 2 depicts a graph 200 of the difference between estimated and measured blade rotational speed and the estimated torque force in a saw that experiences kickback that is detected during process 100. As depicted in the time region 204, during a kickback event, the measured and estimated blade speeds diverge to a much larger degree than during normal operation of the saw. The estimated force due to torque on the drive shaft also increases abruptly compared to the normal force that is exerted when cutting through a work piece. In the illustrative embodiment of FIG. 4, the controller 428 activates the blade arrest mechanism 420 to halt or withdraw the blade 404. Once the blade 404 halts or is retracted from contact with the work piece, the kickback ceases and the saw 400 reduces or eliminates the kickback force that is applied to the work piece. The controller 428 also deactivates the motor 408.

Figure 3:
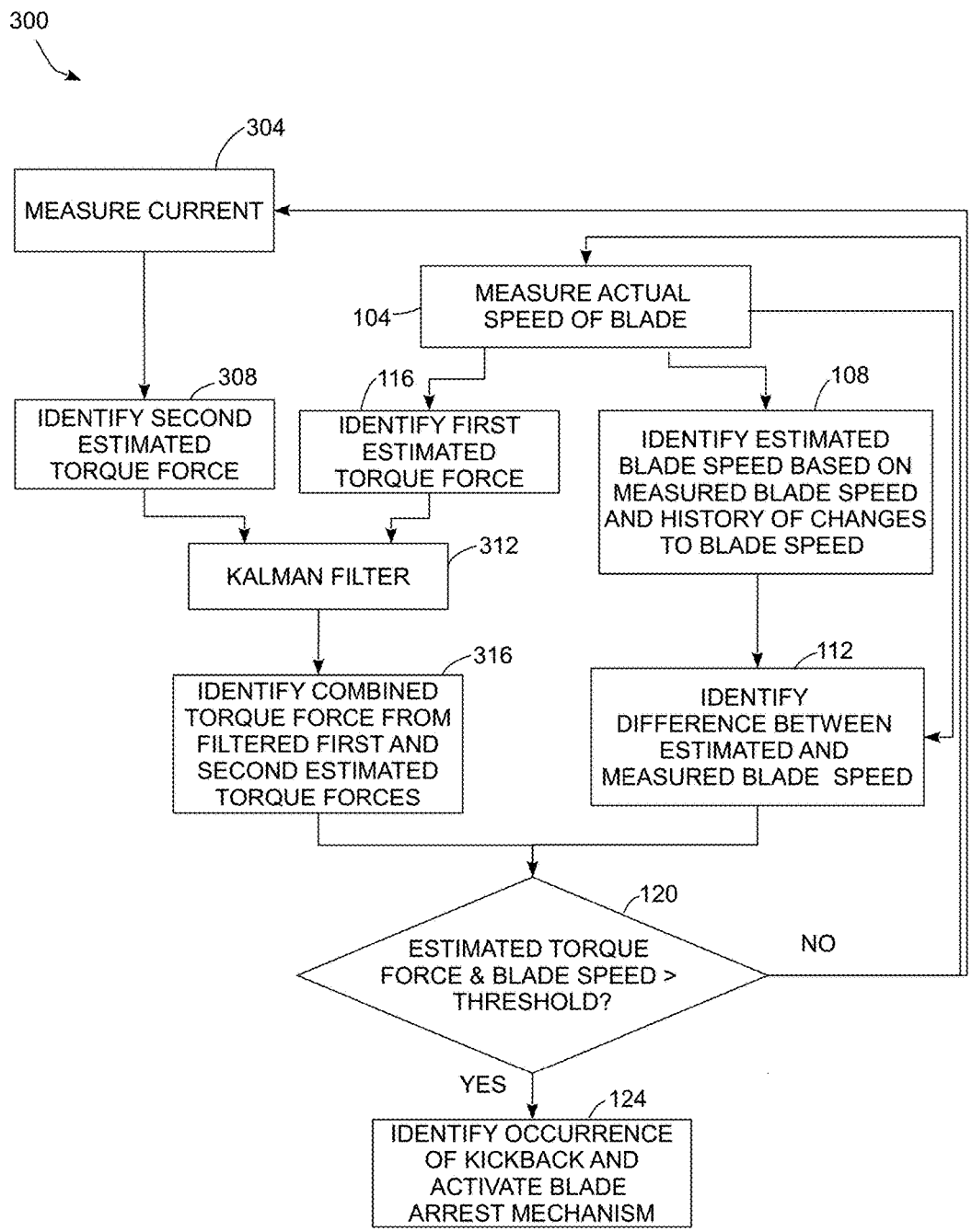
FIG. 3 is a block diagram of another process for detecting kickback during operation of a saw.

FIG. 3 depicts a process 300 for detecting kickback in a saw. The process 300 includes many of the same operations that are described above with regards to the process 100, including the processing of blocks 104-124 in the process 100. The process 300 further additionally includes the generation of a second estimate of the torque force in the drive shaft of the motor 408 and the combination of the first force estimate and the second force estimate with a Kalman filter to produce a combined estimate of the torque force around the shaft of the motor 408. The process 300 is described in conjunction with the saw 400 of FIG. 4 for illustrative purposes.

During the process 300, the controller 428 measures the level of current that the motor 408 receives with the current sensor 416 (block 304), the controller 428 identifies a second estimate of the torque force in the motor 408 (block 308). In one embodiment, the controller 428 identifies the second estimate of the torque $T_2$ using the following linear equation: $T_2(i)=m_3*c(i)+m_4$, where $c(i)$ is the measured current level from the current sensor 416 and $m_3$ and $m_4$ are empirically determined coefficients that correspond to the torque characteristics of the motor 408 for varying input current levels. The corresponding second estimated torque force for the drive shaft having a predetermined diameter d in the motor 408 is: $Est\_f_2(i)=T_2(i)/d$.

During the process 300, the controller 428 uses a Kalman filter to generate a final estimate of the torque force $Est\_f_{final}(i)$ (block 312). The final torque force is estimated based on the first estimate $Est\_f_1(i)$ that is based on the quadratic relationship of blade velocity to torque from the processing of block 116 and the second estimate of torque force that is generated from the processing of block 308 using the following function: $Est\_f_{final}(i)=Kalman(Est\_f_1(i), Est\_f_2(i), noise(i))$, where $noise(i)$ refers to the variances in the measured rotational speed of the blade 404 that introduces noise into the estimated torque force $Est\_f_1(i)$ (block 316). The process 300 continues using the final measured torque force and the error between the estimated and measured blade rotational speeds to identify an occurrence of kickback (block 120). The controller 428 activates the blade arrest mechanism 420 to halt the rotation of the blade 404 or withdraw the bladed 404 below the surface of the table in the circular saw 400 if kickback is detected (block 124).

It will be appreciated that variants of the above-described and other features and functions, or alternatives thereof, may be desirably combined into many other different systems, applications or methods. Various presently unforeseen or unanticipated alternatives, modifications, variations or improvements may be subsequently made by those skilled in the art that are also intended to be encompassed by the following claims.

What is claimed:

1. A circular saw comprising:
a motor configured to rotate a blade to cut a work piece;
a rotational rate sensor configured to identify a rotational speed of the blade;
a blade arrest mechanism; and
a controller operatively connected to the motor, the rotational rate sensor, the blade arrest mechanism, and a memory device, the controller being configured to:
operate the motor to rotate the blade;
identify a measured rotational speed of the rotating blade with reference to signals from the rotational rate sensor;
identify an estimated rotational speed of the rotating blade with reference to the measured rotational speed, at least one previously measured rotational speed stored in the memory device, and a measurement of a previous change in rotational speed of the rotating blade stored in the memory device;
identify an estimated torque for a drive shaft of the motor with reference to a quadratic equation that is dependent upon the measured rotational speed;
identify an estimated torque force for the drive shaft of the motor with reference to the estimated torque divided by a predetermined diameter of the drive shaft; and
activate the blade arrest mechanism in response to a difference between the measured rotational speed and the estimated rotational speed exceeding a first threshold and the estimated torque force exceeding a second threshold.

2. The circular saw of claim 1 wherein the blade arrest mechanism is a blade brake configured to halt rotation of the saw blade.

3. The circular saw of claim 1 wherein the blade arrest mechanism is a blade retraction mechanism configured to withdraw the blade from contact with the work piece.

4. The circular saw of claim 1 wherein the rotational rate sensor is a Hall Effect sensor.

5. A circular saw comprising:
a motor configured to rotate a blade to cut a work piece;
a rotational rate sensor configured to identify a rotational speed of the blade;
a blade arrest mechanism;
an electric current sensor configured to measure a level of current consumed by the motor; and
a controller operatively connected to the motor, the rotational rate sensor, the blade arrest mechanism, the electric current sensor, and a memory device, the controller being configured to:
operate the motor to rotate the blade;
identify a measured rotational speed of the rotating blade with reference to signals from the rotational rate sensor;
identify an estimated rotational speed of the rotating blade with reference to the measured rotational speed, at least one previously measured rotational speed stored in the memory device, and a measurement of a previous change in rotational speed of the rotating blade stored in the memory device;
identify a first estimated torque force for the drive shaft of the motor in the saw that rotates the blade with reference to the measured rotational speed;
identify a second estimated torque force for the drive shaft of the motor with reference to a measurement of current consumed by the motor from the electric current sensor; and
identify a third estimated torque force for the drive shaft of the motor with reference to the first estimated torque force and the second estimated torque force; and
activate the blade arrest mechanism in response to a difference between the measured rotational speed and the estimated rotational speed exceeding a first threshold and the third estimated torque force exceeding a second threshold.

6. The circular saw of claim 5, the controller being further configured to:
identify an estimated torque for the drive shaft of the motor with reference to a linear equation that is dependent upon a measured current level for the motor from the electrical current measurement sensor; and
identify the second estimated torque force with reference to the estimated torque divided by a predetermined diameter of the drive shaft.

7. The circular saw of claim 5, the controller being further configured to:
identify noise associated with rotation of the blade with reference to a variance of the rotational speed of the drive shaft that corresponds to changes in the measured rotational speed of the blade generated from a plurality of measurements of the rotational speed of the blade generated at a plurality of times by the rotational rate sensor; and apply a Kalman filter to the first estimated torque force, the second estimated torque force, and the noise to identify the third estimated torque force.

8. The circular saw of claim 5 wherein the blade arrest mechanism is a blade brake configured to halt rotation of the saw blade.

9. The circular saw of claim 5 wherein the blade arrest mechanism is a blade retraction mechanism configured to withdraw the blade from contact with the work piece.

10. The circular saw of claim 5 wherein the rotational rate sensor is a Hall Effect sensor.

* * * * *